United States Patent Office 2,802,771
Patented Aug. 13, 1957

2,802,771

FUNGICIDAL COMPOSITIONS CONTAINING SALTS OF A HYDROXYQUINOLINE AND THE METHOD OF PREPARING THE SAME

Ellis K. Fields, Chicago, Ill., and Roger W. Watson, Highland, Ind., assignors to Standard Oil Company, Chicago, Ill., a corporation of Indiana No Drawing. Application July 12, 1954,
Serial No. 442,906

8 Claims. (Cl. 167—33)

This invention is directed to improvements in fungicidal compositions, and more particularly is directed to fungicidal compositions containing a solubilized salt of a hydroxy quinoline and to the method of preparing the same.

Salts of hydroxyquinolines, in which at least one hydroxy group is attached to the benzene nucleus of the quinoline radical, and particularly the alkaline earth and heavy metal salts thereof, are well known fungicidal materials. Examples of such salts are the calcium, barium, magnesium, lead, mercury, cobalt, nickel, iron, copper, silver, zinc, aluminum, etc. salts of 5-hydroxyquinoline, 6-hydroxyquinoline, 7-hydroxyquinoline or 8-hydroxyquinoline. Preferred, however, are the heavy metal salts, particularly the copper, zinc and nickel salts of 8-hydroxyquinoline. Of these, the copper salt is preferred. A serious drawback to the more extensive use of such salts as fungicides and mildew-proofing agents for wood, leather and fabric materials is their insolubility in organic solvents such as oily materials, benzol, toluol, petroleum naphthas, petroleum thinners, chlorinated hydrocarbon solvents, and other organic solvents or thinners commonly used in the art for fungi-proofing and mildew-proofing. This is a serious disability since for many purposes it is necessary to use solutions of the fungicide, such as in dip-treating materials, such as fabrics, wood, etc. for fungi-proofing and mildew-proofing the same.

It is an object of this invention to provide a method of solubilizing salts of a hydroxyquinoline. Another object of the invention is to provide a method of increasing the solubility of heavy metal salts of 8-hydroxyquinoline in normally liquid organic solvents. Another object of the invention is to provide a copper 8-quinolinolate composition soluble in hydrocarbon solvents. Still another object of the invention is to provide a fungicidal composition containing a solubilized heavy metal 8-quinolinolate. Other objects and advantages of the invention will become apparent from the following description thereof.

In accordance with the present invention, salts, particularly heavy metal salts of a hydroxyquinoline, especially 8-hydroxyquinoline, can be made soluble in normally liquid organic solvents, such as normally liquid hydrocarbon solvents, by treatment at a temperature of from about 220° F. to about 400° F., preferably from about 275° F. to about 325° F. with a hydrolyzed reaction product of a phosphorus sulfide and a hydrocarbon. In the solubilizing treatment, from about 5% to about 40% of the salt of the hydroxyquinoline is added, preferably in small proportions, to the hydrolyzed phosphorus sulfide-hydrocarbon reaction products while heating with stirring at the aforementioned temperature until all of said quinolinolate has been added, and the heating continued for about 10 minutes to 2 hours thereafter. Solution of said quinolinolate in the hydrolyzed phosphorus sulfide-hydrocarbon reaction product occurs quite rapidly and appears to be the function of stirring efficiency. If desired, the product can be dissolved in a light solvent, such as hexane, and the sludge, if any, removed by settling, filtering, and/or centrifuging. The solvent or diluent can then be removed by evaporation or distillation. This method of solubilizing quinolinolates is applicable to alkaline earth and heavy metal salts of a hydroxyquinoline, i. e. 5-, 6-, 7-, or 8-hydroxyquinolines, and particularly 8-hydroxyquinoline.

The hydrolyzed phosphorus sulfide-hydrocarbon reaction products can be prepared by reacting the hydrocarbon with from about 1% to about 50% and preferably from about 5% to about 30% of a phosphorus sulfide such as $P_2S_3$, $P_4S_3$, $P_4S_7$, and preferably $P_2S_5$ at a temperature of from about 200° F. to about 600° F., and preferably at a temperature of from about 400° F. to 500° F., preferably while maintaining a non-oxidizing atmosphere, such as for example, an atmosphere of nitrogen, above the reaction mixture. The reaction mixture is then hydrolyzed by steam or other suitable means at a temperature of from about 220° F. to about 500° F. and preferably at a temperature of from 300° F. to 400° F. If desired, the hydrolyzed reaction product can be contacted with an alkaline adsorbent material such as fuller's earth, bauxite, magnesite, bentonite, Floridin, etc. Reaction products of a phosphorus sulfide and a hydrocarbon and neutralized products thereof are described in U. S. 2,316,080 and 2,316,082.

Under some conditions, prolonged exposure to ultraviolet irradiation of the herein described salts of hydroxyquinolines solubilized by the present invention may cause precipitation of the metal sulfide. We have found that this can be avoided by employing hydrolyzed phosphorus sulfide-hydrocarbon reaction products or the neutralized hydrolyzed reaction product having a lower sulfur content or such reaction products substantially free of sulfur. Reduction in the sulfur content of such hydrolyzed reaction products can be accomplished by steaming such products at a temperature of from about 200° F. to about 600° F. In place of steam, other agents having an active hydrogen such as alcohols, ammonia, amines, etc., as described in U. S. 2,316,083, issued April 6, 1943, can be used.

The hydrocarbon constituent of this reaction is preferably a mono-olefin hydrocarbon polymer resulting from the polymerization of low molecular weight mono-olefinic hydrocarbons or isomono-olefinic hydrocarbons such as propylenes, butylenes and amylenes or the copolymers obtained by the polymerization of hydrocarbon mixtures containing isomono-olefins and mono-olefins of less than 6 carbon atoms. The polymers may be obtained by the polymerization of these olefins or mixtures of olefins in the presence of a catalyst such as sulfuric acid, phosphoric acid, boron fluoride, aluminum chloride, or other similar halide catalysts of the Friedel-Crafts type.

The polymers employed are preferably mono-olefin polymers or mixtures of mono-olefin polymers and iso-mono-olefin polymers having molecular weights ranging from about 200 to about 10,000 or more, and preferably from about 350 to about 5,000. Such polymers can be obtained, for example, by the polymerization in the liquid phase of a hydrocarbon mixture containing mono-olefins such as butylene and isobutylene at a temperature of from about −80° F. to about 100° F. in the presence of a metal halide catalyst of the Friedel-Crafts type, such as for example, boron fluoride, aluminum chloride, and the like. In the preparation of these polymers, we may employ, for example, a hydrocarbon mixture containing isobutylene, butylenes, and butanes, recovered from petroleum gases, especially those gases produced in the cracking of petroleum oils in the manufacture of gasoline.

A suitable polymer for the reaction with phosphorus sulfide is the product obtained by polymerizing in the liquid phase a hydrocarbon mixture containing butylenes and isobutylenes, together with butanes and some $C_3$ and $C_5$ hydrocarbons at a temperature between about 0° F. and 30° F. in the presence of aluminum chloride. A suitable method for carrying out the polymerization is to introduce the aluminum chloride into the reactor and introduce the hydrocarbon mixture, cooled to a temperature of about 0° F., into the bottom of the reactor and pass it upwardly through the catalyst layer while regulating the temperature within the reactor, so that the polymer product leaving the top of the reactor is at a temperature of about 30° F. After separating the polymer from the catalyst sludge and unreacted hydrocarbons, the polymer is fractionated to obtain a fraction of the desired viscosity such as for example from about 80 seconds to about 2000 seconds Saybolt Universal at 210° F.

Another suitable polymer is that obtained by polymerizing in the liquid phase a hydrocarbon mixture comprising substantially $C_3$ hydrocarbons in the presence of an aluminum chloride-complex catalyst. The catalyst is preferably prepared by heating aluminum chloride with isooctane. The hydrocarbon mixture is introduced into the bottom of the reactor and passed upwardly through the catalyst layer, while a temperature of from about 50° F. to about 110° F. is maintained in the reactor. The propane and other saturated gases pass through the catalyst while the propylene is polymerized under these conditions. The propylene polymer can be fractionated to any desired molecular weight, preferably from about 500 to about 1000, or higher.

Other suitable polymers are those obtained by polymerizing a hydrocarbon mixture containing about 10% to about 25% isobutylene at a temperature of from about 0° F. to about 100° F., and preferably from about 0° F. to about 32° F. in the presence of boron fluoride. After the polymerization of the isobutylene together with a relative minor amount of the normal olefins present, the reaction mass is neutralized, washed free of acidic substances and the unreacted hydrocarbons subsequently separated from the polymers by distillation. The polymer mixture so obtained, depending upon the temperature of reaction, varies in consistency from a light liquid to viscous, oily material and contains polymers having molecular weights ranging from about 300 to about 2000, or higher. The polymers so obtained may be used as such, or the polymer may be fractionated under reduced pressure into fractions of increasing molecular weights and suitable fractions obtained reacted with the phosphorus sulfide to obtain the desired reaction products. The bottoms resulting from the fractionation of the polymer which may have Saybolt Universal viscosities at 210° F. ranging from 50 seconds to about 10,000 seconds are well suited for the purpose of the present invention.

Essentially paraffinic hydrocarbons such as bright stock residuums, lubricating oil distillates, petrolatums or paraffin waxes may be used. There can also be employed the condensation products of any of the foregoing hydrocarbons, usually through first halogenating the hydrocarbons, with aromatic hydrocarbons in the presence of anhydrous inorganic halides, such as aluminum chloride, zinc chloride, boron fluoride and the like.

Examples of high molecular weight olefinic hydrocarbons which can be employed as reactants are cetene ($C_{16}$), cerotene ($C_{26}$), melene ($C_{30}$), and mixed high molecular weight alkenes obtained by cracking petroleum oils.

Other preferred olefins suitable for the preparation of the herein described phosphorus sulfide reaction products are olefins having at least 20 carbon atoms in the molecule of which from about 13 carbon atoms to about 18 carbon atoms, and preferably at least 15 carbon atoms are in a long chain. Such olefins can be obtained by the dehydrogenation of paraffins, such as by the cracking of paraffin waxes, or by the dehalogenation of alkyl halides, preferably long chain alkyl halides, particularly halogenated paraffin waxes.

The olefins obtained by dehalogenation of long chain alkyl halides are preferably those obtained by dehydrohalogenation of monohalogenated waxes, such as for example, those obtained by dehydrochlorination of monochloroparaffin wax. The alkyl halides are decomposed to yield olefins according to the reaction $$C_nH_{2n+1}X \rightarrow HX + C_nH_{2n}$$

in which $n$ is a whole number, preferably 20 or more, and X is a halogen. It is preferred to employ paraffin waxes having at least about 20 carbon atoms per molecule, and melting points upwards from about 90° F. to about 140° F.

To obtain the halogenated paraffin wax, for example, chlorinated paraffin wax, chlorine is introduced into the wax, maintained in a molten state, until the wax has a chlorine content of from about 8% to about 15%. The chlorinated wax product is a mixture of unchlorinated wax, monochlorowax and polychlorowax. This chlorinated product may be used as such, but it is advantageous to use the substantially monochlorowax fraction. The monochlorowax fraction can be segregated from the unchlorinated wax and the polychlorowax fractions by taking advantage of the differences in the melting points of the various fractions, since the melting point of the wax varies with the extent of chlorination, i. e., the melting point of the unchlorinated wax is greater than that of the monochlorowax, and the melting point of the latter is greater than that of the polychlorowax. Thus, the monochloroparaffin wax can be separated from the unchlorinated and the polychloroparaffin wax fractions by means such as sweating, fractional distillation, solvent extraction, solvent precipitation and fractional crystallization.

The high molecular weight olefins are obtained by removing the halogen as hydrogen halide from the halogenated paraffin wax. For example, the corresponding olefin is obtained from the monochloroparaffin wax my removing the chlorine from the latter as hydrogen chloride. The monochlorowax can be dehydrochlorinated by heating to a temperature of from about 200° F. to about 600° F. in the presence of a dehydrochlorinating agent, such as an alkali metal hydroxide or an alkaline earth metal hydroxide or oxide. Other alkaline inorganic or organic materials can also be used. The chlorine can also be removed from the chlorowax by heating the same for a prolonged period in the absence of any dehydrochlorinating agent. After the dehydrohalogenation has been completed the olefin so obtained can be further purified by removing the dehydrohalogenating agent by means of filtration or by other suitable means.

As a starting material there can be used the polymer or synthetic lubricating oil obtained by polymerizing the unsaturated hydrocarbons resulting from the vapor phase cracking of paraffin waxes in the presence of aluminum chloride which is fully described in United States Patents Nos. 1,955,260, 1,970,402 and 2,091,398. Still another type of olefin polymer which may be employed is the polymer resulting from the treatment of vapor phase cracked gasoline and/or gasoline fractions with sulfuric acid or solid adsorbents, such as fuller's earth, whereby unsaturated polymerized hydrocarbons are removed. Also contemplated within the scope of this invention is the treatment with phosphorus sulfide of the polymers resulting from the voltolization of hydrocarbons as described, for example, in United States Patent No. 2,197,768 and 2,191,787.

Also contemplated within the scope of the present invention are the reaction products of a phosphorus sulfide with an aromatic hydrocarbon, such as for example, benzene, naphthalene, toluene, xylene, diphenyl and the like, or with an alkylated aromatic hydrocarbon, such as for example, benzene having an alkyl substituent having at least four carbon atoms and preferably at least eight carbon atoms, such as a long chain paraffin wax.

While any of the hydrolyzed phosphorus sulfide-hydrocarbon reaction products are effective in the solubilizing of heavy metal 8-quinolinolates, such as copper 8-quinolinolate, we prefer to use the hydrolyzed reaction products of phosphorus sulfide and an olefin polymer such as a polybutene having a molecular weight of from about 300 to about 2,000. We have found that in solubilizing of the heavy metal 8-quinolinolate, mixtures of hydrolyzed phosphorus sulfide-hydrocarbon reaction products and salts of such neutralized hydrolyzed reaction products can also be used. The salts of the neutralized hydrolyzed phosphorus sulfide-hydrocarbon reaction products are obtained by neutralizing the hydrolyzed product with a suitable alkaline reagent such as a hydroxide, oxide, carbonate or sulfide of an alkali metal or an alkaline earth metal compound such as for example, sodium hydroxide, potassium hydroxide, lithium hydroxide, sodium carbonate, calcium hydroxide, calcium carbonate, barium hydroxide, barium oxide, sodium sulfide, or heavy metal hydroxides such as for example, zinc hydroxide, nickel hydroxide, cobalt hydroxide, etc. The heavy metal salts can also be formed by metathesis. Neutralization of the hydrolyzed phosphorus sulfide-hydrocarbon reaction products can be carried out at a temperature of from about 110° F. to about 500° F. and preferably from 200° F. to about 350° F. using stoichiometric amounts or more of the basic reagents.

When mixtures of the hydrolyzed phosphorus sulfide-hydrocarbon reaction product and a salt thereof are employed as the solubilizing agent, such mixtures can contain from about 50% to about 95% of the hydrolyzed product and from about 5% to about 50% of the neutralized hydrolyzed reaction product.

As noted hereinabove, the present invention is applicable to the solubilizing of alkaline earth and heavy metal salts of hydroxyquinolines, i. e. quinolines having at least one hydroxy group attached to the benzene nucleus of the quinoline radical, such as for example 5-hydroxyquinoline, 6-hydroxyquinoline, 7-hydroxyquinoline and 8-hydroxyquinoline. The heavy metal quinolinolates, such as the lead, mercury, cobalt, nickel, iron, silver, zinc, aluminum, copper, etc. salts, and particularly copper 8-quinolinolate, especially can be solubilized by the herein described method.

The following examples are illustrative of the present invention:

*Example I*

A mixture of 1100 grams of a butylene polymer, having a molecular weight of about 330, and 330 grams of $P_2S_5$ was heated under an atmosphere of nitrogen at 400–420° F. for six hours. The reaction product cooled to 300° F., was hydrolyzed by steaming for 4 hours, and then water-washed and dried. The product analyzed 70.03% C, 12.20% H, 5.49% P, and 6.0% S.

*Example II*

Fifty grams of the hydrolyzed $P_2S_5$-butylene polymer reaction product obtained in Example I was stirred at 300° F. while 20 grams of copper-8-quinolinolate was added in small increments. After all of the copper-8-quinolinolate was added, heating was continued at 300° F. for 15 minutes. The mixture was then cooled, dissolved in hexane and centrifuged; the hexane solution was decanted from a small amount of sludge (about 0.6 gram) and the hexane evaporated off. About 69 grams of a brownish-green, very viscous product containing 3.92% copper was recovered which was completely soluble in hexane and Stoddard solvent. Hexane concentrates of the product were completely miscible with mineral oils.

Other heavy metal quinolinolates, such as for example, mercury, zinc, iron, silver 8-quinolinolates can be similarly solubilized by the method of Example II.

*Example III*

A hydrolyzed reaction product of $P_2S_5$ and a butylene polymer of about 330 molecular weight was prepared as in Example I to give a product containing 3.74% sulfur.

A mixture of this product and copper-8-quinolinolate was treated as in Example II.

Products containing from about 5% to about 40% of a solubilized heavy metal 8-quinolinolate, such as copper-8-quinolinolate can be prepared by the method of this invention.

Fabrics treated with solutions of the product of Example II in Stoddard solvent and buried in moist soil gave good protection against fungi. Cotton duck (8.70 oz.) dip-impregnated with a Stoddard solvent solution of the product of Example III so as to deposit 0.05, 0.1 and 0.2% copper on the fabric gave passing results on weathering and burial tests.

Salts of hydroxyquinolines of the type herein described solubilized by the method of this invention are soluble in organic solvent such as for example, petroleum solvents, toluol, xylol, benzol, coal tar solvents, chlorinated hydrocarbons, e. g., carbon tetrachloride, etc.

Suitable fungicidal and/or fungistatic compositions can be formulated by dissolving in suitable organic solvents, such as a suitable hydrocarbon solvent or vehicle from about 2% to about 20% of a metal salt of a hydroxyquinoline, e. g. copper-8-quinolinolate, heat-treated with a hydrolyzed reaction product of a phosphorus sulfide and a hydrocarbon, or a mixture of such hydrolyzed product and neutralized products thereof as herein above described. If desired, the solubilized product of this invention can be emulsified or dispersed in aqueous media with the aid of suitable well known emulsifying agents.

Percentages used herein and in the appended claims are weight percentages unless otherwise stated.

We claim:

1. The method of organic solvent solubilizing a heavy metal salt of 8-hydroxyquinoline comprising mixing said salt with a hydrolyzed reaction product of a phosphorus sulfide and an olefin polymer, while heating said mixture at a temperature of from about 200° F. to about 400° F. and maintaining said temperature for a period of from 10 minutes to about 120 minutes after all said incremental salt of 8-hydroxyquinoline has been added, said hydrolyzed reaction product of the phosphorus sulfide and the olefin polymer being prepared by reacting said olefin polymer with from about 1% to about 50% of a phosphorus sulfide at a temperature of from about 200° F. to about 600° F., and hydrolyzing the resultant reaction product at a temperature of from about 220° F. to about 500° F.

2. As a new composition of matter, the product obtained by the method of claim 1.

3. The method of organic solvent solubilizing copper-8-quinolinolate comprising adding from about 5% to about 40% of said quinolinolate in small increments to a hydrolyzed reaction product of phosphorus pentasulfide and a polybutene having a molecular weight of from about 200 to about 50,000 at a temperature of from about 220° F. to about 400° F. and maintaining said temperature for a period of from 10 minutes to about 120 minutes after all of said quinolinolate has been added, said hydrolyzed reaction product of the phosphorus pentasulfide and the polybutene being prepared by reacting said polybutene with from about 1% to about 50% of phosphorus pentasulfide at a temperature of from about 200° F. to about 600° F., and hydrolyzing the resultant reaction product at a temperature of from about 220° F. to about 500° F.

4. As a new composition the product obtained by the method of claim 3.

5. The method of organic solvent solubilizing a heavy metal salt of a hydroxyquinoline normally insoluble in an organic solvent, comprising mixing said salt with a hydrolyzed reaction product of a phosphorus sulfide and an olefin polymer, and a neutralized hydrolyzed reaction product of a phosphorus sulfide and an olefin polymer, heating said mixture at a temperature of from about 200° F. to about 400° F. while maintaining said temperature for a period of from 10 minutes to about 120 minutes, said hydrolyzed reaction product of the phosphorus sulfide and the olefin polymer being prepared by reacting said olefin polymer with from about 1% to about 50% of a phosphorus sulfide at a temperature of from about 200° F. to about 600° F., and hydrolyzing the resultant reaction product at a temperature of from about 220° F. to about 500° F.

6. As a new composition the product obtained by the method of claim 5.

7. The method of claim 5 in which the neutralized hydrolyzed reaction product of the phosphorus sulfide and the olefin polymer is an alkaline earth-containing neutralized product.

8. The method of claim 7 in which the alkaline earth is barium.

References Cited in the file of this patent
UNITED STATES PATENTS

| | | |
|---|---|---|
| 2,316,080 | Loane et al. | Apr. 6, 1943 |
| 2,387,591 | Kolb | Oct. 23, 1943 |
| 2,608,556 | Kalberg | Aug. 26, 1952 |